(12) United States Patent
Naghdy et al.

(10) Patent No.: US 10,331,727 B2
(45) Date of Patent: Jun. 25, 2019

(54) GRAPHICAL USER INTERFACE TO DISPLAY COMMONLY CATEGORIZED ENTITIES

(71) Applicant: GOOGLE INC., Mountain View, CA (US)

(72) Inventors: Nabil Naghdy, Baar (CH); Melisa Tokmak, Stanford, CA (US); Signe Nørly, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 206 days.

(21) Appl. No.: 15/372,139

(22) Filed: Dec. 7, 2016

(65) Prior Publication Data
US 2018/0157669 A1    Jun. 7, 2018

(51) Int. Cl.
| | |
|---|---|
| *G06F 16/44* | (2019.01) |
| *G06T 11/60* | (2006.01) |
| *G06F 3/0482* | (2013.01) |
| *G06F 3/0484* | (2013.01) |
| *G06F 16/35* | (2019.01) |
| *G06Q 30/02* | (2012.01) |

(52) U.S. Cl.
CPC .......... *G06F 16/444* (2019.01); *G06F 3/0482* (2013.01); *G06F 3/04845* (2013.01); *G06F 16/35* (2019.01); *G06Q 30/02* (2013.01); *G06T 11/60* (2013.01); *G06T 2200/24* (2013.01)

(58) Field of Classification Search
CPC combination set(s) only.
See application file for complete search history.

(56) References Cited

U.S. PATENT DOCUMENTS

| | | | |
|---|---|---|---|
| 8,489,641 B1* | 7/2013 | Seefeld ............. | G06F 17/30241 707/792 |
| 9,057,612 B1* | 6/2015 | Savvopoulos ..... | G01C 21/3423 |
| 2005/0187707 A1* | 8/2005 | Yokota ............... | G01C 21/3476 701/410 |

(Continued)

FOREIGN PATENT DOCUMENTS

WO    2013/126763 A1    8/2013

OTHER PUBLICATIONS

Dahl, "International Search Report and Written Opinion issued in International Application No. PCT/US2017/054122", dated Dec. 15, 2017, 10 pages.

*Primary Examiner* — Hien L Duong
(74) *Attorney, Agent, or Firm* — Johnson, Marcou & Isaacs, LLC (57) ABSTRACT

Rendering graphical user interfaces to a user computing device to display commonly categorized entities includes receiving a search request comprising a point of interest query input into a graphical user interface hosted by the one or more computing devices. The system determines airports or other commonly categorized entities, that are closest to the point of interest and displays a list of the entities that are closest to the point of interest. The graphical user interface configures a set of boundaries for a map display on the graphical user interface based on a configured number of entities to be displayed and presents the point of interest and the entities on the map. The graphical user interface displays a transit time for one or more modes of transportation from the point of interest to each of the entities to allow the user to assess the preferred entity.

20 Claims, 7 Drawing Sheets

(56) References Cited

U.S. PATENT DOCUMENTS

| | | | |
|---|---|---|---|
| 2005/0251331 A1* | 11/2005 | Kreft | G01C 3/08 701/438 |
| 2007/0073562 A1* | 3/2007 | Brice | G06Q 10/02 705/5 |
| 2008/0208443 A1* | 8/2008 | Massie | G01C 21/00 701/532 |
| 2009/0177387 A1* | 7/2009 | Liu | G01C 21/20 701/533 |
| 2013/0046795 A1* | 2/2013 | Borgerson | G06Q 10/06 707/798 |
| 2013/0073323 A1* | 3/2013 | Zacharia | G06Q 10/025 705/5 |
| 2013/0253833 A1* | 9/2013 | Tuukkanen | G01C 21/26 701/538 |
| 2014/0052714 A1* | 2/2014 | Brodziak | G06Q 10/02 707/722 |
| 2014/0351037 A1* | 11/2014 | Shaam | G06Q 50/14 705/14.23 |
| 2014/0365113 A1* | 12/2014 | McGavran | G01C 21/00 701/425 |
| 2015/0081418 A1* | 3/2015 | Sahai | G06Q 30/0259 705/14.41 |
| 2015/0160028 A1* | 6/2015 | Burrows | G01C 21/3423 701/527 |
| 2015/0187107 A1* | 7/2015 | Vander Mey | G06Q 30/00 345/629 |
| 2015/0220538 A1 | 8/2015 | Seefeld et al. | |
| 2015/0253143 A1* | 9/2015 | Bailiang | G01C 21/34 701/527 |
| 2016/0138925 A1* | 5/2016 | Takahashi | B60L 11/1809 701/533 |
| 2016/0298977 A1* | 10/2016 | Newlin | G01C 21/3423 |
| 2016/0358471 A1* | 12/2016 | Hajj | G01C 21/3423 |
| 2016/0371800 A1* | 12/2016 | Kirshenboim | G06F 17/30867 |
| 2017/0123618 A1* | 5/2017 | Porcella | G01C 21/367 |
| 2017/0153113 A1* | 6/2017 | Gotoh | G06Q 50/10 |
| 2017/0185271 A1* | 6/2017 | Manoharan | G06Q 10/02 |
| 2017/0357733 A1* | 12/2017 | Lobo | G06F 3/0488 |
| 2017/0358113 A1* | 12/2017 | Bray | G06F 3/04845 |
| 2017/0359695 A1* | 12/2017 | Aerts | G06F 3/04883 |
| 2018/0156623 A1* | 6/2018 | West | G01C 21/3423 |

* cited by examiner

```
Receiving a query for a point of interest from a user computing device
and providing textual data on a graphical user interface
```

305
User enters point of interest data into graphical user interface on user computing device 310
Flight search system determines the closest airports to the point of interest 315
Flight search system displays a list of the closest airports to the point of interest and distance data in a graphical user interface 320
Flight search system receives an input from the user computing device to display the nearby airports on a map display of a graphical user interface 215,
Fig. 2

GRAPHICAL USER INTERFACE TO DISPLAY COMMONLY CATEGORIZED ENTITIES

TECHNICAL FIELD

The present disclosure relates to a graphical user interface that displays commonly categorized entities on a user computing device. More specifically, a graphical user interface displays travel times to one or more commonly categorized entities that are nearest to a point of interest responsive to a request on a search system and dynamically updates the displayed travel times in response to movement of the point of interest location on the graphical user interface.

BACKGROUND

Search engine systems, such as flight search systems, receive queries for flights and other travel data from one city to a destination city. For example, if a user is searching for flight data about a particular flight or a particular route, the airline system may provide data related to that flight or a group of similar flights, such as flight times, airplane descriptions, airport stops, and price information. In conventional systems, flights are typically shown as originating or arriving from an airport designated by a user or a major airport related to the arrival or departure city. In conventional systems, the flight search systems request an input from the user to select a particular airport.

SUMMARY

Techniques herein provide computer-implemented methods to render graphical user interfaces to display commonly categorized entities. The techniques include receiving a search request for a point of interest input into a graphical user interface hosted by one or more computing devices. The method determines airports, or other commonly categorized entities, that are closest to the point of interest and displays a list of the airports that are closest to the point of interest. The technology configures a set of boundaries for a map display on the graphical user interface based on a configured number of airports to be displayed and presents the point of interest and the airports on the map. The graphical user interface displays a transit time for two or more modes of transportation from the point of interest to each of the airports to allow the user to assess the preferred airport.

In certain other example aspects described herein, systems and computer program products to render graphical user interfaces to render graphical user interfaces to display commonly categorized entities are provided.

These and other aspects, objects, features and advantages of the example embodiments will become apparent to those having ordinary skill in the art upon consideration of the following detailed description of illustrated example embodiments.

DETAILED DESCRIPTION

Overview

In certain examples, a search system determines the closest, most convenient, or otherwise most appropriate commonly categorized entities to a point of interest. The commonly categorized entities may be any suitable entity of which the user may desire to identify the most convenient instance. For example, the commonly categorized entities may be airports, train stations, post offices, museums, banks, or any other suitable entity. The user desires to identify the nearest entities and also to identify the transit time to the entities based on one or more transit options. Throughout the application, examples depicting a search for the nearest available airport to a point of interest are used, however, other commonly categorized entities may also be searched, such as train stations, museums, or post offices. The example search system is referred to as a flight search system, however, a museum search system or other special purpose search system might similarly be utilized.

In an example, a flight search system obtains airport data and other data from an airline system, a mapping system, airport management systems, the Federal Aviation Administration, or any other suitable source. The addresses, geo-location, or any other suitable identifier of the locations of airports may be stored in a database on the flight search system. The flight search system applies the locations to a mapping system that operates on the flight search system to allow representation on a graphical user interface to a user.

The flight search system receives a request for a point of interest on the graphical user interface from a user to find nearby airports. The point of interest may be a tourist attraction, a specific address, a business or organization location, a sports arena, a government building, or any other suitable location. For example, the user may input "golden gate bridge" to determine the most accessible airports to the golden gate bridge. In another example, the user may input "Rockefeller Center" to determine the most accessible airports to Rockefeller Center.

The flight search system displays on the graphical user interface to a user a list of airports that are accessible to the location. For example, the flight search system may display the three closest airports or the ten closest airports. The flight search system may further display the distance to each airport. The distance may include travel times via one or more transit modes, the linear distance, the distance via the shortest highway route, or any other suitable data.

The flight search system receives from the user on the graphical user interface a request to display the closest airports on a map. The flight search system prepares a map display for the graphical user interface that indicates the location of the point of interest and the nearest airports. The map may be scaled to display the closest airports, such as the closest 1, 3, or 5 airports.

The display may include a line connecting the point of interest to each of the displayed airports. The display includes data related to the distance to each displayed airport. For example, the display may include the number of miles to each airport, or the transit time to drive, walk, or take public transportation to each airport. The display may display the price of a flight from the location of the user to each of the displayed airports. The price may be a lowest price, an average price, a sample price, or any other flight price display.

The user can move the point of interest on the map by entering a new point of interest ("POI"), dragging the POI location pin to a new location, tapping a section of the map to create a new POI location pin, or performing any other suitable action with the graphical user interface. The display updates the graphical user interface to display updated airport location data corresponding to the current POI. For example, new lines are drawn from the new POI to the airport locations, new transit times are calculated and displayed, and flight price displays are updated.

By using and relying on the methods and systems described herein, the flight search engine provides commonly categorized entity location data responsive to a request from a user by comparing the request with stored data and displaying the results on a graphical user interface on a webpage for the user. By using this convenient format to display location and travel data to the commonly categorized entities, such as the transit time to area airports from a point of interest, the display described herein may be employed to allow users to make better purchasing decisions. Users would not be required to leave a flight search system to conduct travel time searches to area airports. The graphical user interface is improved for a user in that the user will have the opportunity to select a commonly categorized entity that is convenient to the point of interest. Users will not risk selecting a flight to an airport that is further away or harder to reach when they plan a trip to a particular unfamiliar location. User frustration and travel delays will be avoided. Hence, the methods and systems described herein permit flight search systems to improve the user experience and avoid complaints and wasted travel time.

Turning now to the drawings, in which like numerals represent like (but not necessarily identical) elements throughout the figures, example embodiments are described in detail.

Example System Architectures

Figure 1:
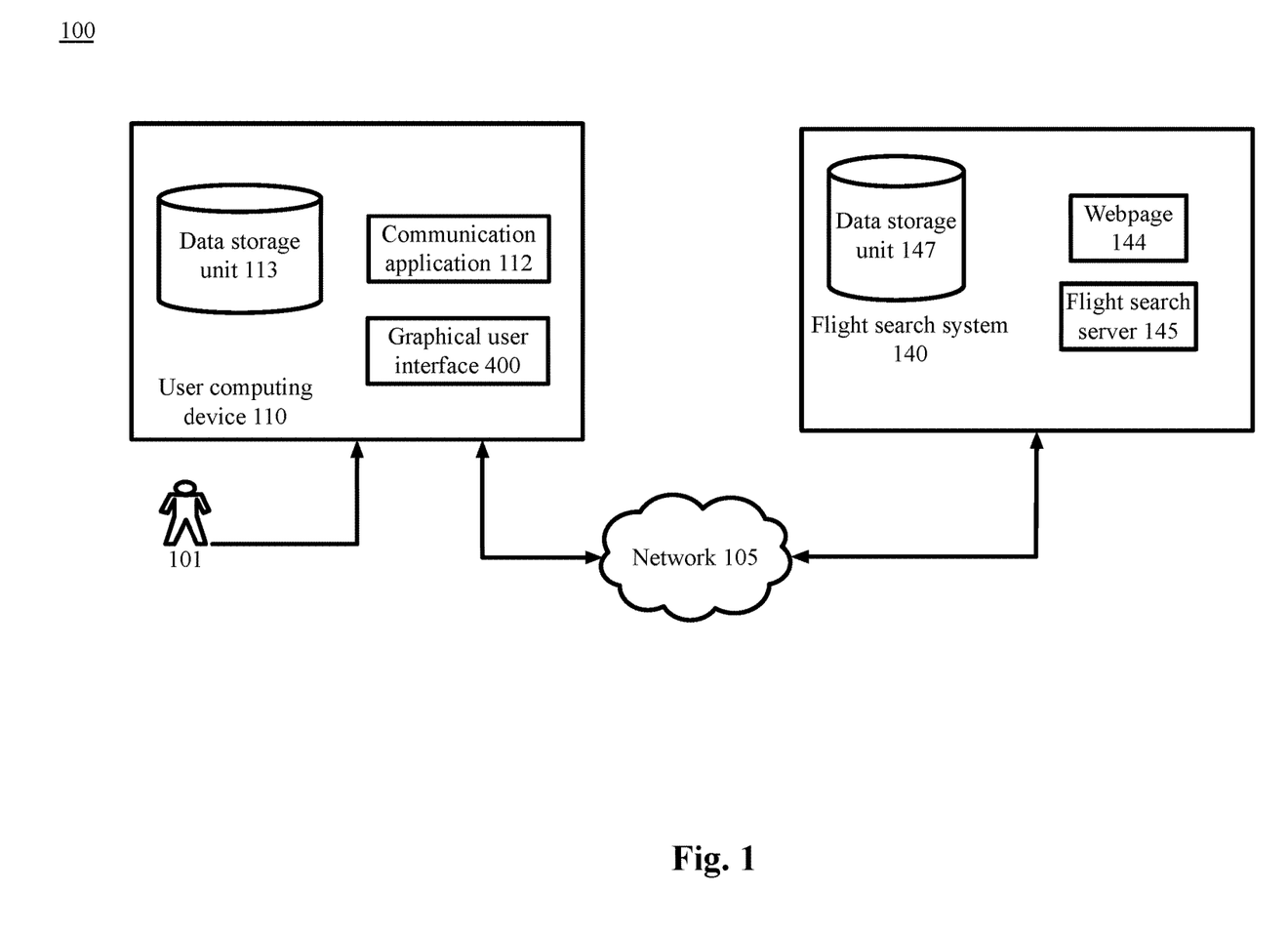
FIG. 1 is a block diagram depicting a system to display nearby commonly categorized entities on a graphical user interface, in accordance with certain example embodiments.

FIG. 1 is a block diagram depicting a system 100 to display nearby commonly categorized entities on a graphical user interface 114, in accordance with certain example embodiments. In some embodiments, a user 101 associated with a user computing device 110 must install an application and/or make a feature selection to obtain the benefits of the techniques described herein.

As depicted in FIG. 1, the system 100 includes network computing devices/systems 110 and 140 that are configured to communicate with one another via one or more networks 105 or via any suitable communication technology.

Each network 105 includes a wired or wireless telecommunication means by which network devices (including devices 110 and 140) can exchange data. For example, each network 105 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data. Throughout the discussion of example embodiments, it should be understood that the terms "data" and "information" are used interchangeably herein to refer to text, images, audio, video, or any other form of information that can exist in a computer-based environment. The communication technology utilized by the devices 110 and 140 may be similar networks to network 105 or an alternative communication technology.

Each network computing device/system 110 and 140 includes a computing device having a communication module capable of transmitting and receiving data over the network 105 or a similar network. For example, each network device 110 and 140 can include a server, desktop computer, laptop computer, tablet computer, a television with one or more processors embedded therein and/or coupled thereto, smart phone, handheld or wearable computer, personal digital assistant ("PDA"), wearable devices such as smart watches or glasses, or any other wired or wireless, processor-driven device. In the example embodiment depicted in FIG. 1, the network devices 110 and 140 are operated by end-users or consumers and flight search system operators, respectively.

The user computing device 110 includes a graphical user interface 114. The graphical user interface 114 may be used to display information to the user 101 to allow the user 101 to interact with the flight search system 140 and others. The graphical user interface 114 receives user input for queries and displays results to the user 101. The graphical user interface 114 may be managed by the flight search system 140. The graphical user interface 114 may be accessed by the user computing device 110. The graphical user interface 114 may display the webpage 144 of the flight search system 140. The graphical user interface 114 instructions or code may be provided by the webpage 144 of the flight search system 140 to the user computing device 110 for rendering on the user computing device 110. Any suitable manner of displaying the graphical user interface 114 on the user computing device 110 to the user 101 may be employed.

The user 101 can use the communication application 112 on a user computing device 110, for example, a web browser application or a stand-alone application, to view, download, upload, or otherwise access documents or webpages via a distributed network 105. The communication application 112 can interact with web servers or other computing devices connected to the network 105, including the web server 145 of the flight search system 140. In an example, the communication application 112 is a web browser that accesses and displays the webpage 144 of the flight search system 140. The communication application 112 allows the user to enter search functions for a flight or other search and receive results, flight data, advertisements, offers, or other suitable webpage displays. The communication application 112 may alternatively be an application that connects to the flight search system 140 or other systems to search flight data. The communication application 112 may be used to allow data to be sent to and from the graphical user interface 114.

The user computing device 110 also includes a data storage unit 113 accessible by the communication application 112, the graphical user interface 114, and one or more applications, such as a digital wallet application and an email application. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory accounts or removable flash memory. In certain embodiments, the data storage unit 113 may reside in a cloud based computing system.

An example flight search system 140 comprises a flight search system server 145 and a data storage unit 143. In an example embodiment, the flight search system server 145 communicates with the airline systems or other systems over the network 105 to request and receive flight data, airport data, GPS data, map data, or other data. The flight search server 145 may receive data from the airline systems 130, scheduling servers, airports, pricing programs, and other suitable parties. The flight search system server 145 receives flight and airport data from an airline system or other providers of flight data. The flight search system server 145 provides a webpage 144. The webpage 144 may be utilized by user 101 or others to request airport or flight data, input user information, receive airport or flight data, or perform any other suitable actions. The webpage 144 may be managed or provided by the flight search system server 145 or any other suitable server. The webpage 144 may alternatively represent a graphical user interface on an application or other software for interacting with the user 101 or the user computing device 110. The flight search server 145 may manage the graphical user interface 114 in any other suitable manner.

In an example embodiment, the data storage unit 147 can include any local or remote data storage structure accessible to the flight search system 140 suitable for storing information. In an example embodiment, the data storage unit 147 stores encrypted information.

It will be appreciated that the network connections shown are examples and other means of establishing a communications link between the computers and devices can be used. Moreover, those having ordinary skill in the art having the benefit of the present disclosure will appreciate that flight search system 140, and the user computing device 110 illustrated in FIG. 1 can have any of several other suitable computer system configurations. For example, a user computing device 110 can be embodied as a mobile phone or handheld computer, and may not include all the components described above.

Figure 7:
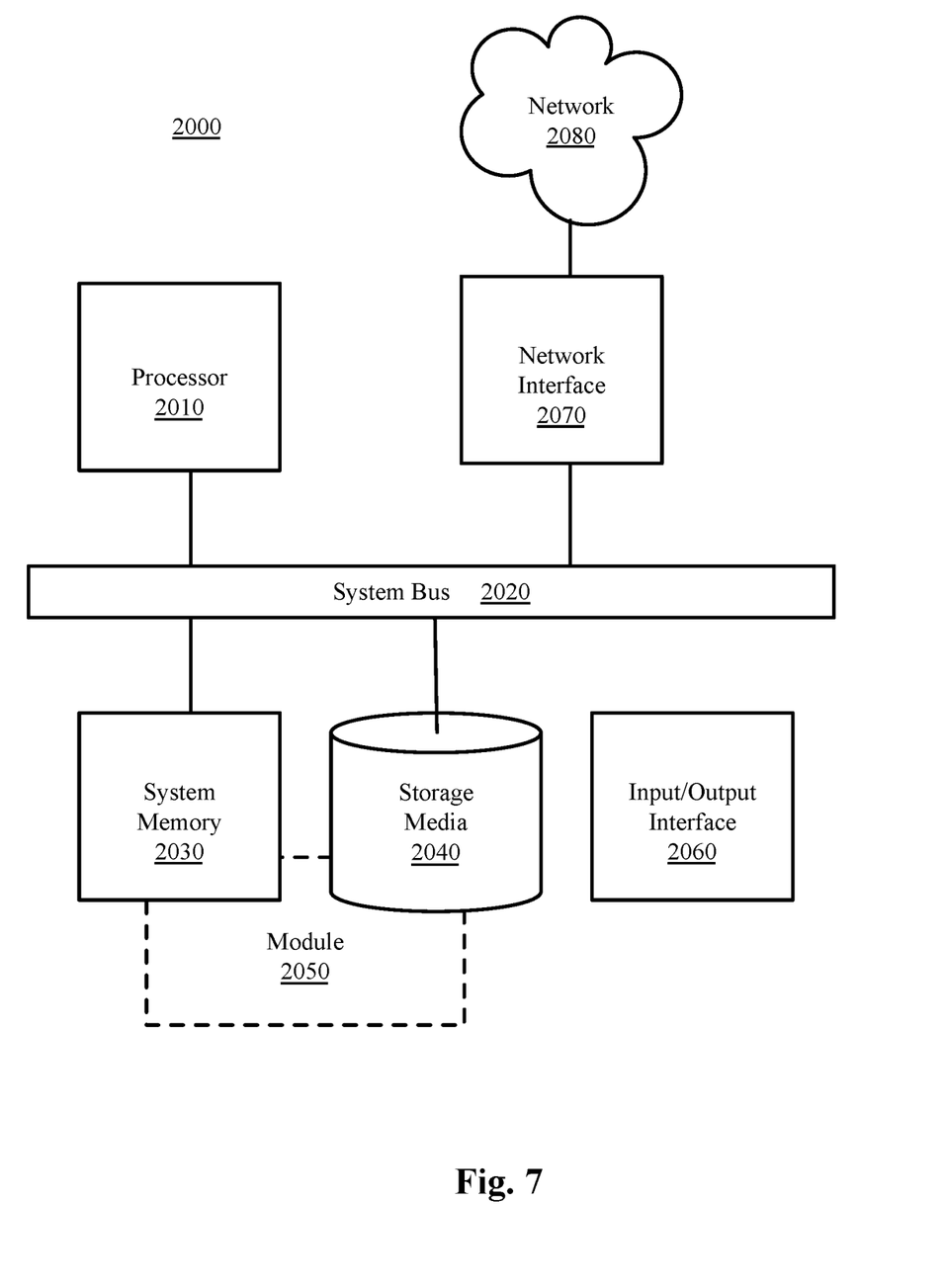
FIG. 7 is a block diagram depicting a computing machine and a module, in accordance with certain example embodiments.

In example embodiments, the network computing devices and any other computing machines associated with the technology presented herein may be any type of computing machine such as, but not limited to, those discussed in more detail with respect to FIG. 7. Furthermore, any functions, applications, or components associated with any of these computing machines, such as those described herein or any others (for example, scripts, web content, software, firmware, hardware, or modules) associated with the technology presented herein, may by any of the components discussed in more detail with respect to FIG. 7. The computing machines discussed herein may communicate with one another, as well as with other computing machines or communication systems over one or more networks, such as network 105. The network 105 may include any type of data or communications network, including any of the network technology discussed with respect to FIG. 7.

Example Processes

Figure 2:
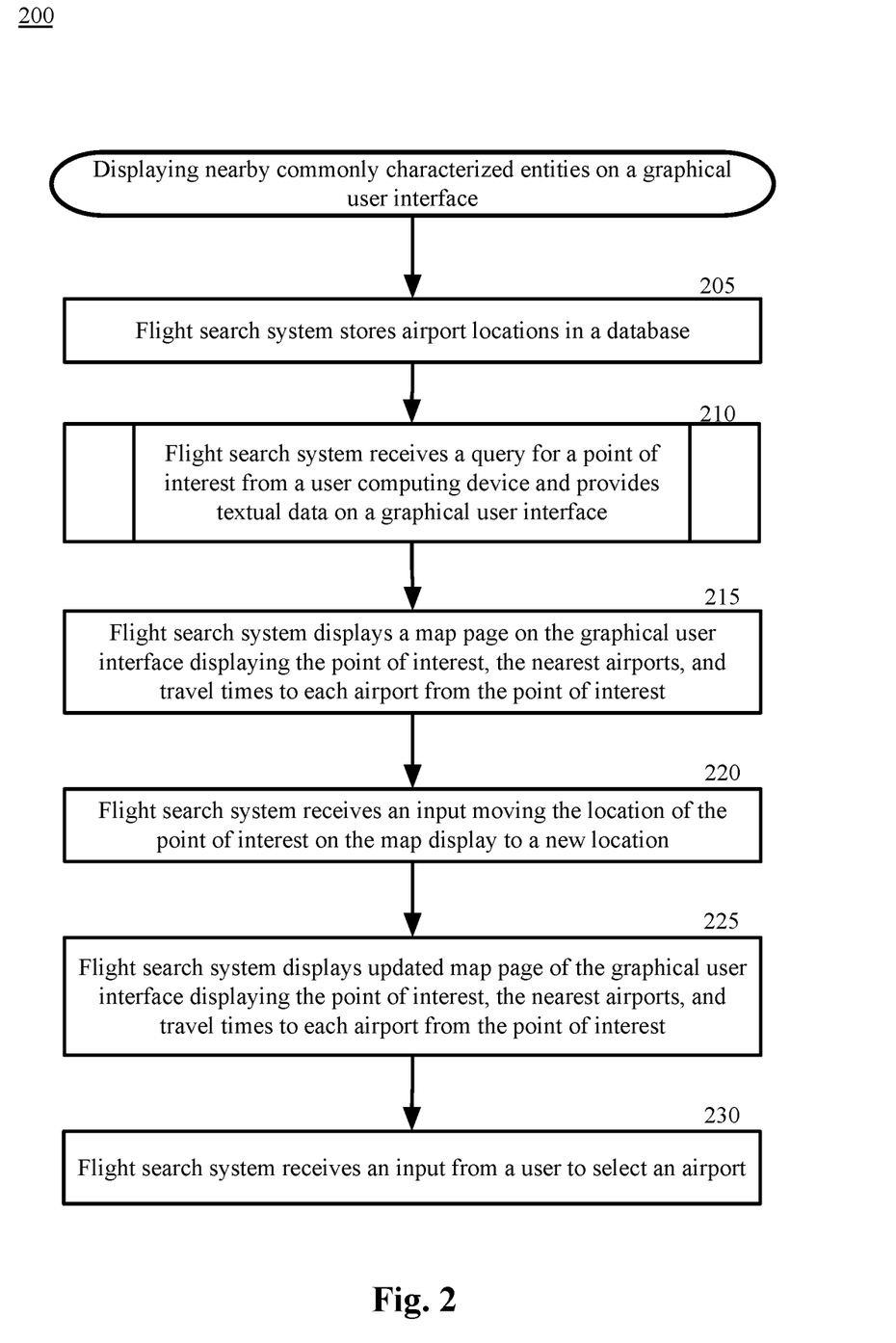
FIG. 2 is a block flow diagram depicting a method to display nearby commonly categorized entities on a graphical user interface, in accordance with certain example embodiments.
Figure 3:
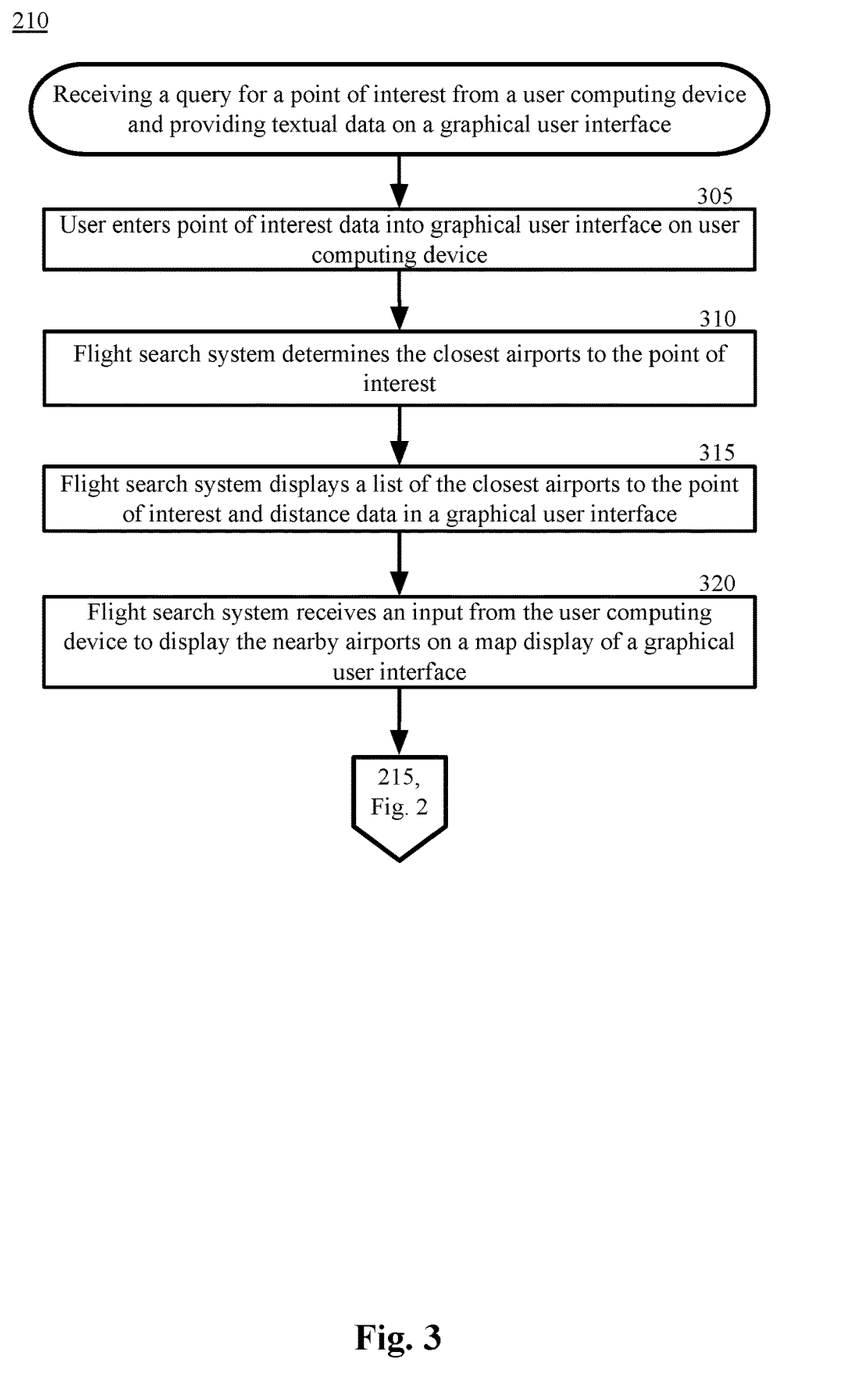
FIG. 3 is a block flow diagram depicting a method to receive a query for a point of interest from a user computing device and provide textual data on a graphical user interface, in accordance with certain example embodiments.

The example methods illustrated in FIG. 2-3 are described hereinafter with respect to the components of the example operating environment 100. The example methods of FIG. 2-3 may also be performed with other systems and in other environments.

FIG. 2 is a block flow diagram depicting a method 200 to display nearby commonly categorized entities on a graphical user interface 114, in accordance with certain example embodiments.

With reference to FIGS. 1 and 2, in block 205, a flight search system 140 stores airport locations in a database on the flight search server 145. In certain examples, a flight search system 140 obtains airport data and other data from an airline system, a mapping system, airport management systems, the Federal Aviation Administration, or any other suitable source. The addresses, geo-location, or any other suitable identifier of the locations of airports may be stored in a database on the flight search server 145 or another storage location associated with the flight search system 140. The flight search system 140 applies the locations to a mapping system that operates on the flight search system 140 to allow representation on a graphical user interface to a user 101 on a user computing device 110 operating a graphical user interface 114.

The flight search system 140 further stores data related to driving routes to and from the airports, walking routes, mass transit routes, or other suitable data for display on the graphical user interface 114. The flight search system 140 further stores data related to flight data associated with the airports, such as flight times, prices, destination and arrival airports, availability, and other suitable flight data.

The requests for data and responses to the requests may be communicated by the flight data system via an Internet message over the network 105, email, instant message, text, or any other suitable communication technology to any system or computing device that provides the requested data, such as an airline system or a travel system.

In block 210, the flight search system 140 receives a query for a point of interest from a user computing device 110 and provides textual data on a graphical user interface 114. The details of block 210 are described in greater detail with respect to method 210 of FIG. 3.

FIG. 3 is a block flow diagram depicting a method 210 to receive a query for a point of interest from a user computing device 110 and provide textual data on a graphical user interface 114, in accordance with certain example embodiments.

In block 305, a user 101 enters point of interest data into a graphical user interface 114 on a user computing device 110. The flight search system 140 receives the request for a point of interest on the graphical user interface 114 from a user 101 to find nearby airports. The point of interest may be a tourist attraction, a specific address, a business or organization location, a sports arena, a government building, or any other suitable location. For example, the user may input "golden gate bridge" to determine the most accessible airports to the golden gate bridge. The request may be on a specific page of the graphical user interface 114 for identifying nearby airports. That is, the user 101 may select an option to find nearby airports and then type in the point of interest. Alternatively, the user 101 may type in the point of interest from a general search screen of the graphical user interface 114 of the flight search system 140. Alternatively, the user 101 may type in the point of interest from a general search screen of the graphical user interface 114 of a generic search engine.

The user 101 may enter the point of interest by typing in the name of the point of interest in the graphical user interface 114, dropping a pin on a map, entering an address, selecting a hyperlink to a location, or identifying the point of interest in any other suitable manner. When the user 101 enters a text representation of the point of interest, the flight search system 140 may use any typical autofill algorithm to predict the point of interest name that the user 101 is entering. The flight search system 140 searches databases of potential points of interest to predict or identify the point of interest that the user 101 intends. The flight search system 140 presents the identified point of interest on the graphical user interface 114 to the user 101 for verification. If the identified point of interest is not the point of interest that the user 101 intended, then the user 101 may refine the search.

In block 310, the flight search system 140 determines the closest airports to the point of interest. The flight search system 140 receives the point of interest from the user entry. The point of interest may be received in any suitable manner, such as by an Internet connection over the network 105. The determination may be made by any suitable calculation and based on any suitable criteria. For example, the distance may be calculated as a straight-line distance between the point of interest and one or more candidate airports. A certain number of selected airports, such as 2 or 5, are identified as having the shortest distance. The identified airports are sorted into a list for display.

In another example, the flight search system 140 determines the distance to the airports from the point of interest based on a shortest driving route. For example, the flight search system 140 maps out various driving routes between the point of interest and an airport and selects the shortest route. The shortest driving route to candidate airports are compared to produce a list of a number, such as two or five, of the closest airports. In another example, the shortest public transit times are used to make the determination. In another example, only airports with flights from the city from which the user 101 is making the request are displayed. In another example, only airports with a greater number of flights per day than a configured threshold of flights are displayed. Any other suitable criteria may be used to select the airports for display.

The distances from the point of interest to the airports may be determined based on a database of distances, from a calculation based on a scale map of the area, from a commercially available mapping system that provides driving distances, from a calculation based on latitudes and longitudes of the points of interest and the airports, or via any other suitable method.

In block 315, the flight search system 140 displays the list of the closest airports to the point of interest and distance data in a graphical user interface 114. After determining the closest airports to the point of interest, the flight search system 140 communicates the list to the user computing device 110 for display in the graphical user interface 114 to the user 101. The communication may be transmitted from the flight search system 140 to the user computing device 110 in any suitable manner, such as by an Internet connection over the network 105.

The display of the airport list in the graphical user interface 114 may include the distance to each airport from the point of interest. For example, the number of direct straight line miles to each airport, the number of driving miles, the number of mass transit miles, the number of walking miles, or any other suitable distance. The display may further include the time required to travel to the airport for any of the transportation methods, such as a number of minutes to drive to the airport.

Figure 4:
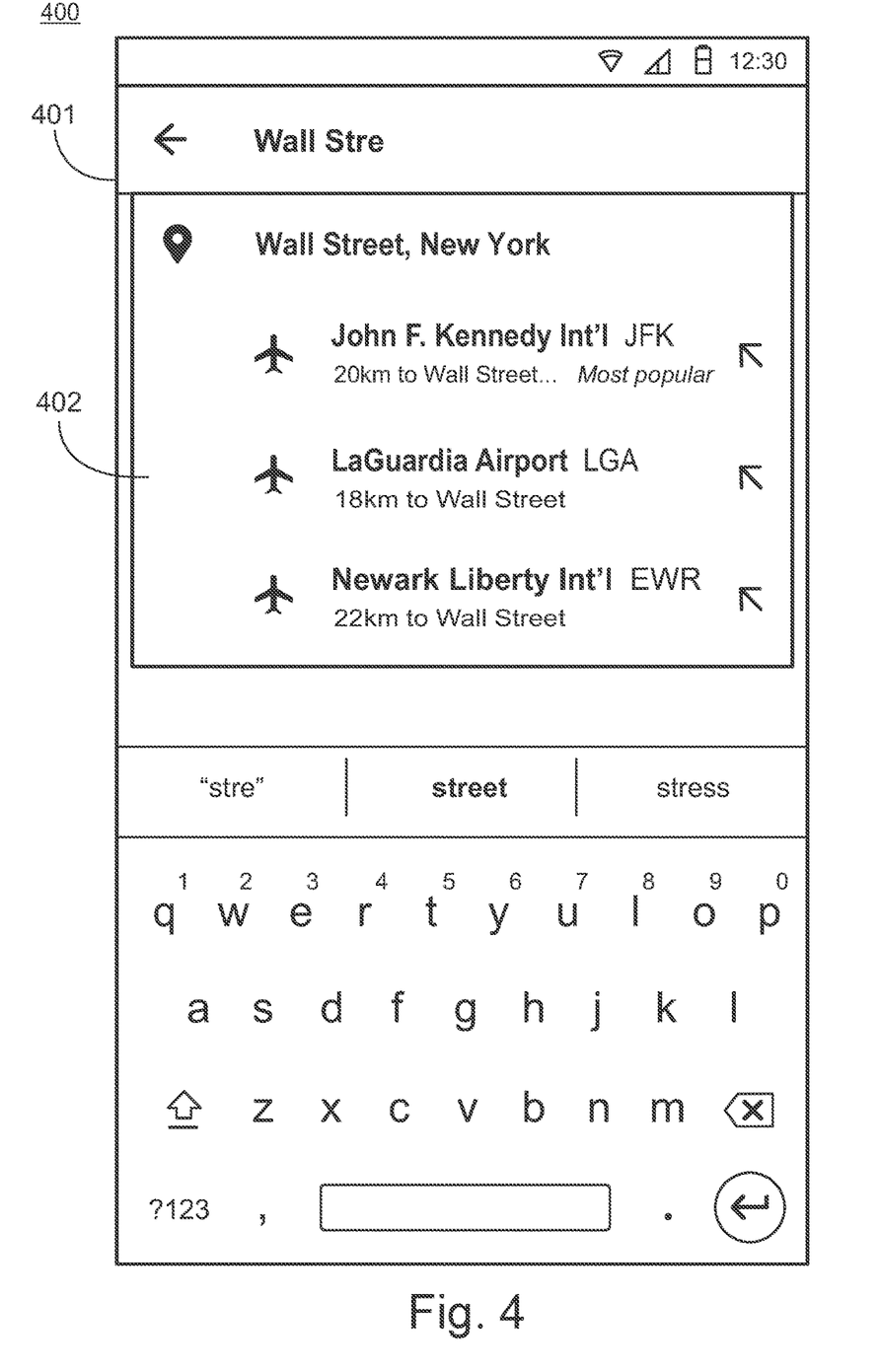
FIG. 4 is an illustration of a user input screen on a graphical user interface displaying airports near a point of interest, in accordance with certain example embodiments.

The details of this function of the graphical user interface 114 are illustrated further in FIG. 4.

FIG. 4 is an illustration of a user input screen 400 on a graphical user interface 114 displaying airports near a point of interest, in accordance with certain example embodiments. The example graphical user interface 114 displaying the user input screen 400 is depicted on a mobile smartphone or other mobile device. The user input screen 400 in FIG. 4 employs traditional smartphone elements, such as the touch-screen keyboard and three suggested autocomplete words, The user input screen 400 depicts a search function entry box 401 to allow the user 101 to enter the point of interest or other search term. The user 101 employs the keyboard displayed on the user input screen 400 to enter the search terms into the entry box 401. In the example, the user 101 has typed "Wall Stre" to indicate that the point of interest the user 101 is searching for is Wall Street in New York City. The graphical user interface 114 has interpreted the entry into the entry box 401 as "Wall Street, New York" as shown at the top of the results box 402 of the user input screen 400.

The graphical user interface 114 provides a listing of the closest airports to Wall Street on the user input screen 400, as described in block 315 herein. The listing is displayed on the results box 402 of the user input screen 400. In the example, the results box 402 displays three airports deemed most convenient or closest to the user 101. The selection of the number of airports to display and which airports to display is performed as described in blocks 310 to 315 herein. The results box 402 indicates the distance from the point of interest to each airport. Other options as described in block 315 may alternatively be displayed.

Returning to FIG. 3, in block 320, the flight search system 140 receives an input from the user computing device 110 to display the nearby airports on a map display of a graphical user interface 114. For example, after entering the point of interest into the graphical user interface 114, the user 101 may be presented on the graphical user interface 114 with an option to view the list of selected airports, such as on a map display. The option may be presented as an object on the graphical user interface 114, such as a virtual button. The user 101 actuates the object to communicate the selection.

From block 320, the method returns to block 215 of FIG. 2.

In block 215, the flight search system 140 displays a map page on the graphical user interface 114 displaying the point of interest, the nearest airports, and travel times to each airport from the point of interest. The flight search system 140 prepares a map display for the graphical user interface 114 that indicates the location of the point of interest and the nearest selected airports. The map may be scaled to display the closest airports, such as the closest 1, 3, or 5 airports.

The display may include a line connecting the point of interest to each of the displayed airports. The display includes data related to the distance to each displayed airport. For example, the display may include the number of miles to each airport, or the transit time to drive, walk, or take public transportation to each airport. The display may display the price of a flight from the location of the user 101 to each of the displayed airports. The price may be a lowest price, an average price, a sample price, or any other price display. The flight price may be gathered from stored flight data or requested from a third party pricing source. The location of the user 101, and thus the location of potential origination airports, are obtained from location data associated with the user computing device 110, such as Wi-Fi location services.

Figure 5:
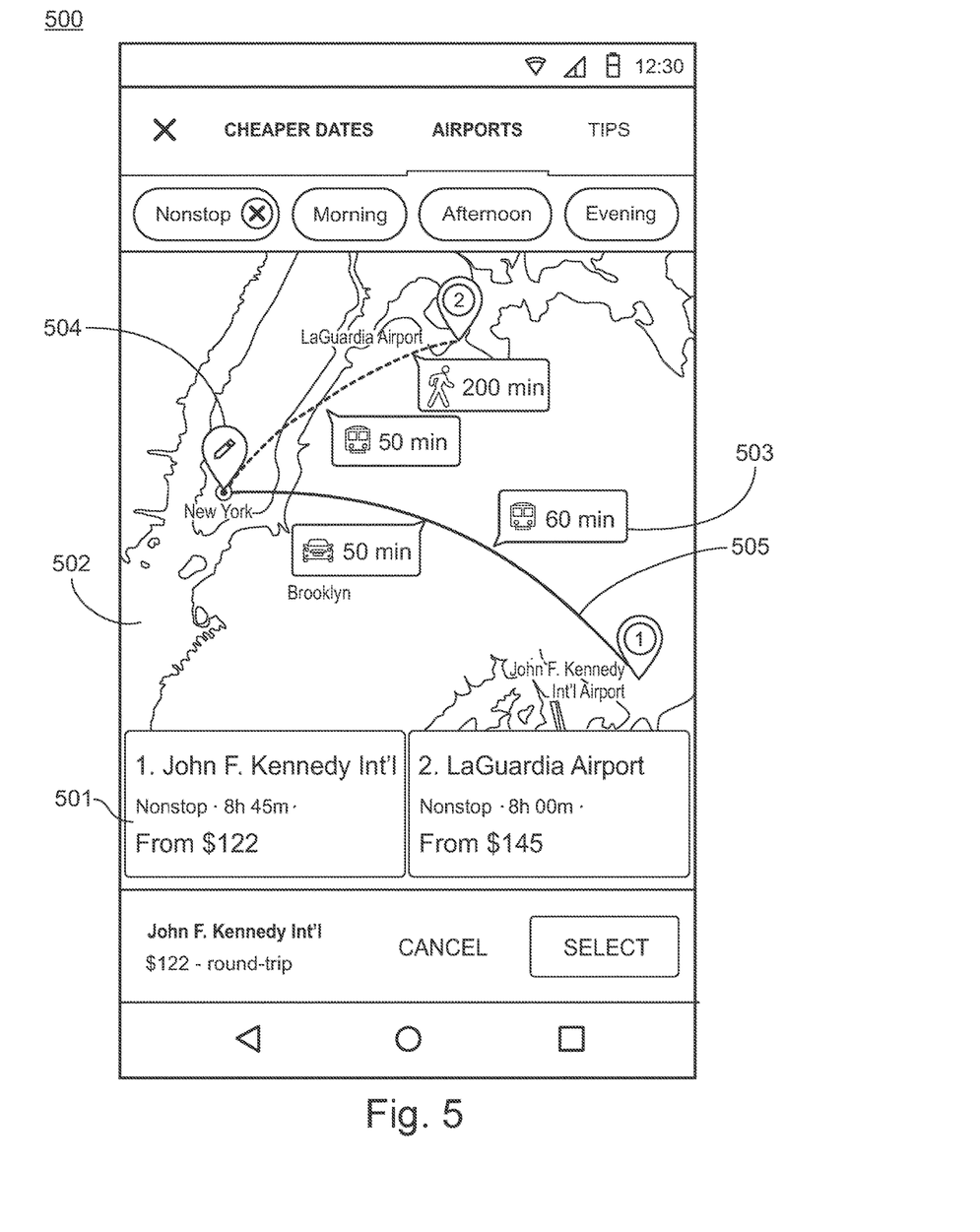
FIG. 5 is an illustration of an example graphical user interface displaying airports near a point of interest location on a map display, in accordance with certain example embodiments.

The details of this function of the graphical user interface 114 are illustrated further in FIG. 5.

FIG. 5 is an illustration of an example graphical user interface 114 displaying airports near a point of interest location on a map display 500, in accordance with certain example embodiments.

The map display 500 includes a display of the selected point of interest, Wall Street, on a map 502 of the area. The point of interest is denoted with a pin 504. The pin 504 is placed on the location of the map 502 representing the location of Wall Street in New York. The map display 500 depicts two nearby airports, John F. Kennedy International ("JFK") and Laguardia Airport (LGA). In the example, the map display 500 is sized by the graphical user interface 114 to display only the two nearest airports. The size may be based on a user preference to display only the two nearest airports, a decision by the graphical user interface 114 based on historical selections of users, an algorithm that compares the attributes of a list of all nearby airports, or any other suitable criteria for selecting the size of the map 502. For example, a map 502 that is zoomed out to display an area 100 miles by 100 miles might display six airports, but the lack of display resolution may make the map 502 difficult to use. Conversely, a map 502 that is zoomed in to display an area five miles by five miles might only display one airport, and thus not provide the user 101 with enough data to make a suitable decision. A map that is zoomed to capture the two or three nearest airports, however, may be a suitable size to convey all of the needed data to the user 101.

The map display 500 places a pin at each location of the two airports, JFK and LGA. The map display 500 illustrates a line from the pin 504 to each airport. For example, the solid line 505 depicts the travel of a user from Wall Street to JFK. The dashed line depicts the travel of a user from Wall Street to LGA.

The map display 500 illustrates the estimated travel times to each airport. For example, a travel time illustration 503 is shown directed towards the solid line 505. The travel time illustration 503 is shown with an estimation that public transportation from Wall Street to JFK would require 60 minutes. The travel time illustration 503 depicts a train or subway car to represent public transportation and "60 min" to represent the estimated travel time. A similar travel time illustration depicts the travel by car as requiring 50 minutes. Other travel time illustrations are shown unlabeled on the map display 500, such as travel time by car and travel time by walking. Any other suitable travel time estimations may be presented, such as biking times, taxi times, streetcar times, or any other suitable travel options.

In certain examples, three or more different travel times to each of the one or more airports may be presented. For example, public transportation times, driving times, and walking times are all displayed for a single journey from a point of interest to an airport.

In certain examples, a single travel time to each of the one or more airports may be presented. For example, one of a public transportation time, driving time, or walking time is displayed for a single journey from a point of interest to one or more of the airports. The single travel time may be for any of the available modes of transportation. The mode of transportation selected may be based on any suitable characteristic. For example, the mode of transportation may be selected based on the mode of transportation that is most popular from the point of interest to an airport. The flight search system 140 may determine the most popular mode of transportation based on an analysis of user selections. For example, a user manually requests a mode of transportation by actuating an object on the map display 500 to select a particular mode of transportation, such as walking. If a greater number of users select walking as the preferred mode of transportation, then walking may be identified as the most popular option. In another example, the flight search system 140 may determine the most popular mode of transportation by analyzing location data of the user computing device 110. For example, if a greater number of people proceed to a subway stop, than to a taxi stand after accessing the map display 500, then public transportation may be determined to be the more popular mode of transportation.

The travel times are identified for display based on any suitable calculation or timetable. For example, a public transportation time may be based on a timetable published by the government agency that manages the transportation system. For example, in the flight search system 140 may determine the closest subway stop to the point of interest. The flight search system 140 analyzes a timetable of the subway and determines the typical travel time to each respective airport. In another example, a traffic mapping system might provide an estimated drive time along a particular route. In another example, the flight search system 140 identifies a walking route to each airport and determines a walking time for each route based on an average walking speed of a typical user. Any other suitable manner of calculating the travel times may be utilized.

The map display 500 displays a carousel of airport options for the user 101 to select. For example, the map display in FIG. 5 depicts an airport selection object 501 displaying the first recommended airport, JFK, and the cost for a flight to this airport from the location of the user 101. The flight price displayed may be selected based on the method 200 described in block 215 of FIG. 2. The map display 500 may display any suitable number of airports and flights, such as 2, 3, or 5. The multiple airports may be displayed on a carousel as depicted on the map display 500.

The map display 500 displays an option to select the first recommended airport. For example, the option may be a virtual button to select the first recommended airport and/or the selected flight. The user 101 may select the flight or the airport in any suitable manner, such as by selecting the airport pin, selecting the airport selection object 501 on the carousel, or selecting the virtual button directed to the first recommended airport.

In an alternate example, the line from the point of interest to an airport, such as the line 505, represents a driving route. For example, instead of a straight line or a single curved line depicting a flyover route directly to the airport, the line 505 follows the available roads that are determined to be the most efficient route to the airport. The route may be selected based on the fastest route, the shortest route, or any other suitable criteria. Alternatively or additionally, other routes, such as a walking route, or a public transportation route may be displayed.

Returning to FIG. 2, in block 220, the flight search system 140 receives an input moving the location of the point of interest on the map display 500 to a new location. The user 101 can move the point of interest on the map by entering a new point of interest, dragging the location pin to a new location, tapping a section of the map to create a new location pin, or performing any other suitable action with the graphical user interface 114.

In block 225, the flight search system 140 displays an updated map page of the graphical user interface 114 displaying the new point of interest, the nearest airports, and travel times to each airport from the new point of interest. The flight search system 140 updates the graphical user interface 114 to display updated airport location data. For example, new lines are drawn from the new point of interest location to the airport locations, new transit times are calculated and displayed, and flight price displays are updated as described in block 215. In an example, if the pin is moved a certain distance, other airports are selected as being the closest or most convenient. The map may be resized, repositioned, or otherwise altered to include a depiction of the location of the newly selected airports.

Figure 6:
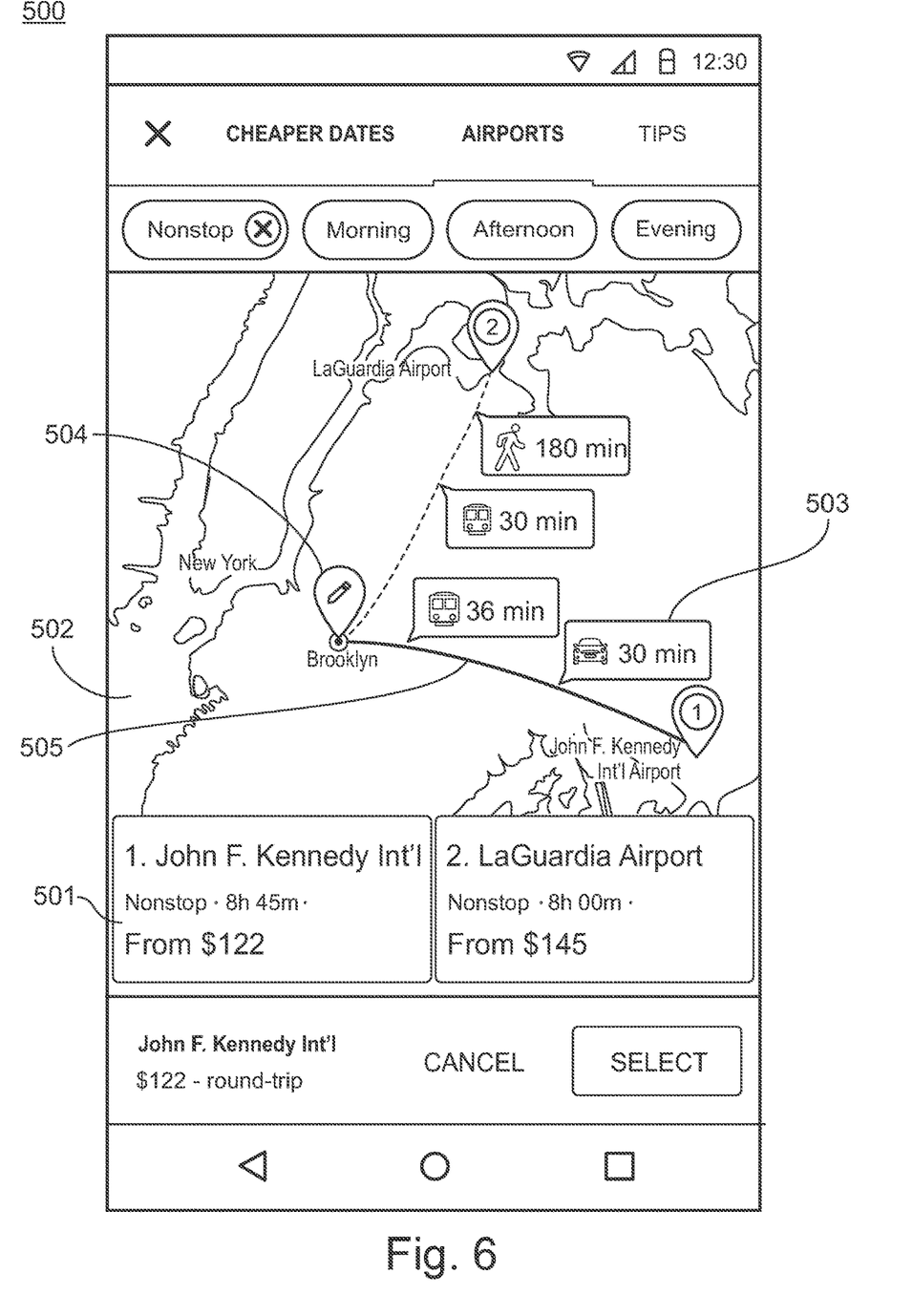
FIG. 6 is an illustration of an example graphical user interface displaying airports near an updated point of interest location on a map display, in accordance with certain example embodiments.

The details of this function of the graphical user interface 114 are illustrated further in FIG. 6. FIG. 6 is an illustration of an example graphical user interface 114 displaying airports near an updated point of interest location on a map display 502, in accordance with certain example embodiments.

The location of the pin 504 is shown as moved from Wall Street to a location in Brooklyn. The lines, such as the solid line 503, representing travel to the two airports, JFK and LGA, are shown as adjusted based on the new pin 504 location. Further, the travel time illustration 503 is shown as updating the travel to JFK to 30 minutes by car and 36 minutes by train. The travel times to LGA are similarly depicted as being updated. The flights to the two airports and the selection of the preferred airport have not changed, such as on the first selected flight option 501 on the carousel. The location of the pin would not affect flights to a particular airport, although the preferred airport might change based on the location of the pin 504.

Returning to FIG. 2, in block 230, the flight search system 140 receives an input from a user 101 to select an airport. The user 101 may employ any of the available options to select an airport, such as by selecting the preferred airport from the carousel or tapping the location pin of the preferred airport. The flight search system 140 receives the selection and directs the graphical user interface 114 to a page displaying flights associated with the selected airport. The graphical user interface 114 may display the flights, prices, times, and other suitable data to the user 101 to allow the user 101 to select and purchase an appropriate flight.

Example Systems

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a wearable computer, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to cause display devices to render user interfaces to present commonly categorized entities on graphical user interfaces, comprising:
   providing, using one or more computing devices, instructions causing a display device to render a graphical user interface on a user computing device, the graphical user interface comprising:
      a point of interest region to receive a point of interest query,
      a point of interest display region to display a list of one or more commonly categorized entities that are most accessible to a point of interest responsive to the point of interest query, and
      a map region to receive an input by a user to display the one or more commonly categorized entities that are closest to the point of interest on the map region,
   wherein the user input is a configured number of the one or more commonly categorized entities to be displayed,
   wherein boundaries of the map region are configured based on the configured number of the one or more commonly categorized entities to be displayed,
   wherein visual indicator of the point of interest and visual indicators of each of the one or more commonly categorized entities are displayed,
   wherein visual representations of a transit time for two or more modes of transportation from the point of interest to each of the one or more commonly categorized entities are simultaneously displayed, and
   wherein text data associated with each of the one or more commonly categorized entities is displayed.

2. The computer-implemented method of claim 1, wherein the map region is configured to display a distance to each of the one or more commonly categorized entities from the point of interest.

3. The computer-implemented method of claim 1, wherein each of the one or more commonly categorized entities is an airport.

4. The computer-implemented method of claim 1, wherein each of the one or more commonly categorized entities is a transportation hub.

5. The computer-implemented method of claim 1, wherein the one or more commonly categorized entities that are determined to be closest to the point of interest are selected based on the shortest driving route between the point of interest and each of the one or more commonly categorized entities.

6. The computer-implemented method of claim 1, wherein the one or more commonly categorized entities that are determined to be closest to the point of interest are selected based on a straight line distance between the point of interest and each of the one or more commonly categorized entities.

7. The computer-implemented method of claim 1, wherein the map region is configured to receive an input from the user computing device to move the location of the point of interest, and
   wherein the map region is updated to display an updated visual indicator of the point of interest, updated visual indicators for each of the one or more commonly categorized entities, and updated visual representations of a transit time for each of the two or more modes of transportation from the point of interest to each of the one or more commonly categorized entities.

8. The computer-implemented method of claim 1, wherein the two or modes of transportation comprises two or more of an automobile, public transportation, walking, and biking.

9. The computer-implemented method of claim 1, wherein the point of interest search request is an input received into a flight search webpage provided by the one or more computing systems.

10. The computer-implemented method of claim 3, wherein the map region is configured to display flight data from an airport near a location of the user computing device to each of the one or more commonly categorized entities.

11. The computer-implemented method of claim 3, wherein the map region is configured to display an option to select a flight associated with displayed flight data from an airport near a location of the user computing device to a particular one of the one or more commonly categorized entities.

12. The computer-implemented method of claim 1, wherein the map region displays a route from the point of interest to one of the one or more commonly categorized entities.

13. A computer program product, comprising:
   a non-transitory computer-readable storage device having computer-executable program instructions embodied thereon that when executed by a computer cause the computer to render graphical user interfaces to display airports close to points of interest, the computer-executable program instructions comprising:
      computer-executable program instructions to display a point of interest region to receive a point of interest query;
      computer-executable program instructions to display a point of interest display region to display a list of one or more commonly categorized entities that are most accessible to a point of interest responsive to the point of interest query; and
      computer-executable program instructions to display a map region to receive an input by a user to display the one or more commonly categorized entities that are closest to the point of interest on the map region,
   wherein the user input is a configured number of the one of more commonly categorized entities to be displayed,
   wherein boundaries of the map region are configured based on the configured number of the one or more commonly categorized entities to be displayed, wherein a visual indicator of the point of interest and visual indicators of the one or more commonly categorized entities are displayed, wherein visual representations of a transit time for two or more modes of transportation from the point of interest to each of the one or more commonly categorized entities are simultaneously displayed, and wherein text data associated with each of the one or more commonly categorized entities is displayed.

14. The computer program product of claim 13, wherein a list of the one or more airports that are closest to the point of interest is displayed on the point of interest region.

15. The computer program product of claim 13, wherein flight data associated with each of the one or more airports is displayed on the map region.

16. A system to render user interfaces for presenting commonly categorized entities on graphical user interfaces, comprising:
 a display device that is configured to render a graphical user interface, the user interface comprising:
  a point of interest region to receive a point of interest query,
  a point of interest display region to display a list of one or more commonly categorized entities that are most accessible to a point of interest responsive to the point of interest query, and
  a map region to receive an input by a user to display the one or more commonly categorized entities that are closest to the point of interest on the map region,
 where in the user input is a configured number of the one or more commonly categorized entities to be displayed,
 wherein boundaries of the map region are configured based on the configured number of the one or more commonly categorized entities to be displayed,
 wherein a visual indicator of the point of interest and visual indicators of the one or more commonly categorized entities are displayed,
 wherein visual representations of a transit time for two or more modes of transportation from the point of interest to each of the one or more commonly categorized entities are simultaneously displayed, and
 wherein text data associated with each of the one or more commonly categorized entities is displayed.

17. The system of claim 16, wherein the map region is configured to display a distance to each of the one or more commonly categorized entities.

18. The system of claim 16, wherein the map region is configured to receive an input from the user computing device to move the location of the point of interest, and
 wherein the map region is updated to display an updated visual indicator of the point of interest, updated visual indicators of the one or more commonly categorized entities, and updated visual representations of a transit time for two or more modes of transportation from the point of interest to each of the one or more commonly categorized entities.

19. The system of claim 16, wherein the one or more commonly categorized entities that are determined to be closest to the point of interest are selected based on the shortest driving route between the point of interest and each of the one or more commonly categorized entities.

20. The system of claim 16, wherein the one or more commonly categorized entities that are determined to be closest to the point of interest are selected based on a straight line distance between the point of interest and each of the one or more commonly categorized entities.

* * * * *